Patented Feb. 8, 1938

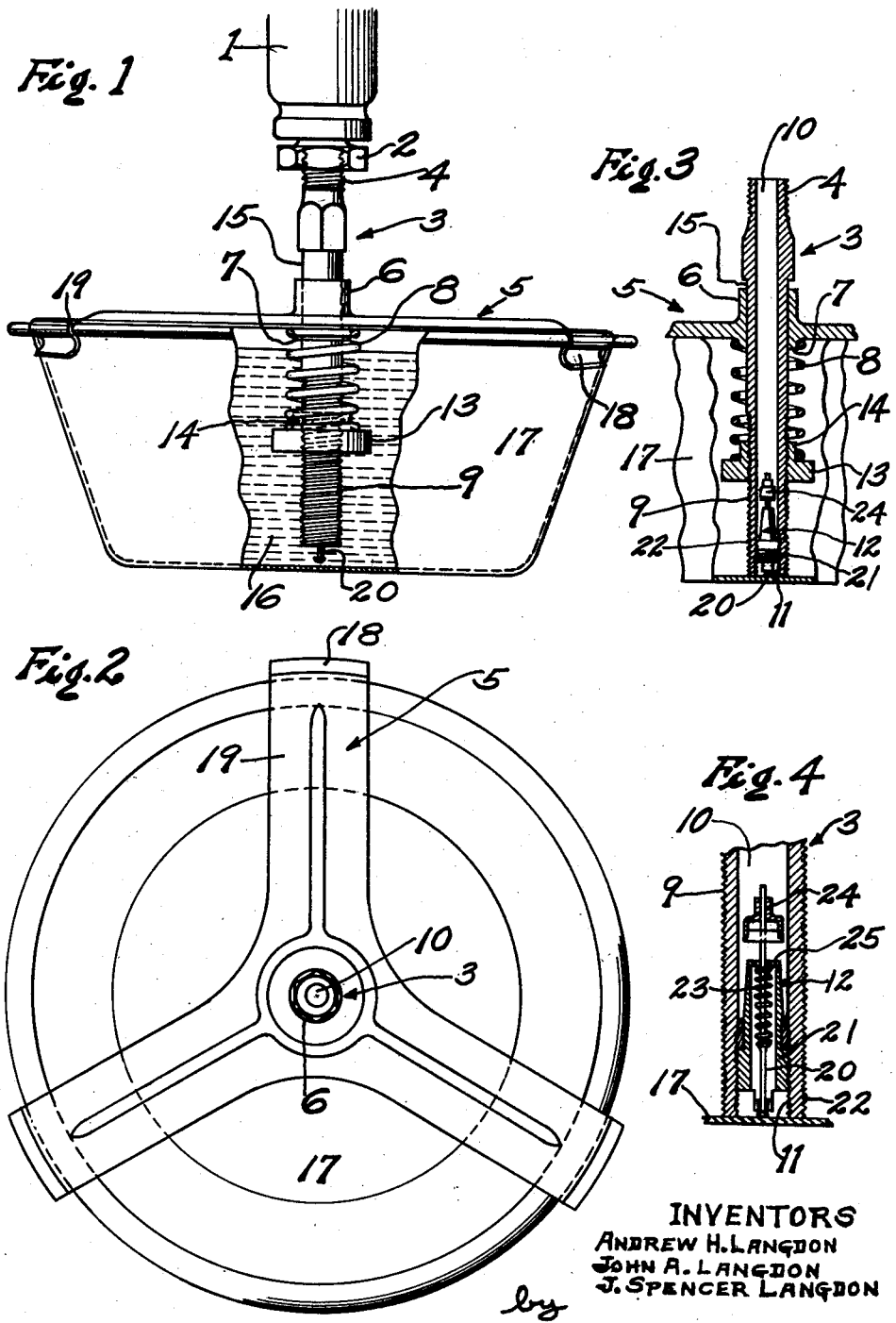

2,107,573

UNITED STATES PATENT OFFICE 2,107,573

POULTRY FOUNTAIN

Andrew H. Langdon, Los Angeles, John A. Langdon, Lancaster, and J. Spencer Langdon, La Habra, Calif.

Application April 13, 1936, Serial No. 74,130

3 Claims. (Cl. 119—81)

This invention relates to poultry yard appliances and an object is to provide at all times drinking water for the poultry.

Another object of the invention is to make a poultry fountain having a valve attachment forming a close connection with a standpipe head so as to receive water from the standpipe head without splashing the water and conduct the water to a fountain drinking receptacle.

A feature of the invention is that the device is so adjusted to permit the weight of the water in the receptacle to so regulate the valve that a certain amount of water will be in the receptacle at all times.

A further object of the invention is to provide a device of such character which may be easily operated and which will eliminate the work of constantly filling the receptacle for the poultry.

Another object of the invention is that the receptacle can be removed and sterilized when desired thus providing a sanitary supply of drinking water at all times.

An advantage of the invention is that it can be attached to the standpipe at the desired heights and thus prevents the poultry from getting their feet into the receptacle.

Other objects, advantages and features of invention may appear from the accompanying drawing, the subjoined detailed description and the appended claims.

The accompanying drawing illustrates the invention.

Figure 1 is a front elevation of the invention showing a fragment of the receptacle broken away to show interior construction and also shows how it is fixed to the standpipe by a reducer connection.

Fig. 2 is a plan view of Fig. 1 showing how the spider clasps the receptacle and omitting the reducer connection and standpipe.

Fig. 3 is a fragmental sectional detail view showing the valve in open position and the water in the receptacle being omitted. Also showing the stem and adjusting nut with spring in position.

Fig. 4 is an enlarged fragmental detail view in section showing the valve in open position.

A standpipe 1 of which a fragment is shown is of the standard construction and only such portion thereof illustrated as required to show how the invention may be fixed thereto. The reducer connection 2 is, or may be of any approved construction.

The stem 3 is connected to the reducer connection 2 by the pipe threads 4 and is slidably mounted in the spider 5 that is provided with a boss extension 6 on the top and an extension 7 on the underneath side that forms a guide and stop for an adjusting spring 8.

The stem 3 is provided with a thread 9 at its bottom end and a passage 10 therethrough having a threaded section 11 that permits a valve 12 to be seated therein.

An adjusting nut 13 is provided on the stem 3 having an extension 14 that the supporting spring 8 rests upon. The stem 3 is provided with a smooth section 15 upon which the spider 5 slides.

16 indicates the water in the receptacle 17 that is held in place by the clasps 18 of the spider arms 19.

The adjusting nut 13 provides an adjustment on the supporting spring 8 that permits a desired water level.

In operation as the receptacle 17 fills up with water the weight of the water overcomes the tension of the supporting spring 8 thereby allowing the receptacle 17 to lower and thus close the valve 12.

The valve 12 comprises the valve stem 20 mounted in the housing 21 that is provided with the threaded portion 22 that fits into the threaded section 11 of the passage 10.

A spring 23 is mounted on the valve stem 20 that pulls the valve seat 24 down over the top 25 of the housing 21 to close the valve 12 when the valve stem 20 is released.

We claim:

1. A poultry fountain fixed to a standpipe head and having a receptacle; means to support said receptacle on said standpipe head comprising a spider and a hollow stem slidably mounting said spider; said stem having threaded means at its top and bottom; an adjusting nut threaded near the bottom and on the stem that allows adjustment for a supporting spring that is interposed between said nut and an extension underneath said spider; a valve situated at the lower end of the stem in the passage, and means to operate the valve to keep the receptacle full of drinking water at all times.

2. A poultry fountain fixed to a standpipe head and having a receptacle; means to support said receptacle on said standpipe head comprising a spider having arms provided with clasps to hold said receptacle to said spider; a stem provided with a passage therethrough and having a valve at its lower end in said passage; said spider being slidably mounted on said stem, and means to operate the valve to fill the receptacle.

3. A poultry fountain fixed to a standpipe head and having a receptacle and a spider having arms provided with clasps to hold said receptacle to said spider; a stem provided with a passage therethrough and having a valve at its lower end in said passage; said spider being slidably mounted on said stem and having a boss extension on its top and an extension on the underneath side that forms a guide and stop for a supporting spring; said stem having threaded means at top and bottom; an adjusting nut threaded near the bottom and on the stem provided with an extension that said supporting spring rests upon, and means to operate the valve to keep the receptacle full at all times.

ANDREW H. LANGDON.
JOHN A. LANGDON.
J. SPENCER LANGDON.